United States Patent Office 3,244,640
Patented Apr. 5, 1966

3,244,640
PROCESS FOR ENCAPSULATING LIQUIDS AND CAPSULES PRODUCED THEREBY
Peter Studt, Berlin, Hans Zoebelein, Dusseldorf-Eller, and Joachim Galinke, Dusseldorf-Holthausen, Germany, assignors to Henkel & Cie, G.m.b.H., Dusseldorf-Holthausen, Germany, a corporation of Germany
No Drawing. Filed June 13, 1962, Ser. No. 208,168
Claims priority, application Germany, June 20, 1961,
H 42,905
8 Claims. (Cl. 252—316)

The invention relates to a novel process for encapsulating liquids which are immiscible or only slightly miscible with water, without the addition of inorganic salts or other substances. The invention also relates to the capsules produced by the said process.

It is known from the work of H. G. B. de Jong that aqueous solutions of hydrophilic colloids such as gelatins or gum arabics can be caused to undergo coacervation (separation into two liquid phases) by adding to said solutions various substances such as inorganic salts or oppositely-charged colloids. The coacerate droplets are known to encase droplets of water-immiscible or slightly water-miscible liquids and to gel and solidify upon cooling to room temperatures thereby forming liquid droplets encased in a gelatin membrane. After hardening of the gelatin membranes in the usual ways such as with formaldehyde, encapsulated suspensions of liquids were obtained which after removal of water can be transformed by known drying methods into free-flowing dry powders.

The individual capsules formed vary in size from microscopic capsules to capsules having a diameter of several millimeters. Various utilities of the encapsulated liquids are known, some of which are based on the fact that the capsules rupture under pressure to liberate the encased liquid.

It is an object of this invention to provide a novel process for encapsulating water-immiscible or slightly water-miscible liquids without the addition of inorganic salts or other substances.

It is another object of the invention to provide novel capsules comprised of water-immiscible or slightly water-miscible liquids within a polymer envelope.

These and other objects and advantages of the invention will become obvious from the following detailed description.

The process of the invention comprises dispersing the liquid to be encapsulated in an aqueous solution having 0.5 to 10%, preferably 1 to 4%, by weight of a water-soluble copolymer of acrylamide and at least one N-substituted acrylamide having the formula

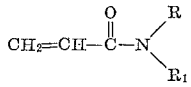

wherein R is an alkyl radical having 1 to 8 carbon atoms and $R_1$ is selected from the group consisting of hydrogen and an alkyl radical having 1 to 7 carbon atoms with the sum of carbon atoms in R and $R_1$ being between 2 and 8, heating the resulting dispersion mixture to effect coacervation, adding a cross-linking agent while maintaining the heat to harden the copolymer, recovering the hardened capsules from the aqueous mixture, and drying the capsules to form a powder of capsules containing the liquid.

The copolymers of acrylamide and N-substituted acrylamide are formed by the usual polymerization methods using catalysts such as organic peroxides. Since the molecular weight of the copolymers influences the coacervation temperature, it is preferred to maintain constant conditions during the polymerization and to add polymerization regulators to obtain copolymers of a constant average molecular weight. The copolymers should be water soluble at temperatures ranging from about 0° to about 30° C. and should separate from aqueous solutions upon being heated to temperatures from about 35° to 90° C.

Examples of suitable N-substituted acrylamides which are useful in forming the acrylamide copolymer are N-ethylacrylamide, N,N-diethylacrylamide, N-propylacrylamide, N-isopropylacrylamide, N-butylacrylamide, N,N-dibutylacrylamide, N-isobutylacrylamide, N-tert-butylacrylamide, N-tert-amylacrylamide, N-octylacrylamide, etc. Mixtures of the said N-substituted acrylamides may also be used.

The weight ratio of acrylamide to N-substituted acrylamide in the copolymers may vary within wide limits and the said ratio will depend upon the specific N-substituted acrylamide used and the desired coacervation temperature. The coacervation temperature will decrease as the amount of the N-substituted acrylamide is increased. In the preferred copolymer of acrylamide and N-tert-butylacrylamide, the weight ratio may vary between 35:65 and 65:35.

The liquid to be encapsulated may be dispersed in the aqueous solution of the copolymer by any of the conventional methods such as stirring or shaking. In some cases the addition of an emulsifier to the mixture is advantageous. The size of the capsules can be controlled by the rate of stirring. The stirring or shaking is preferably continued during the coacervation and hardening steps to prevent a separation into two separate phases.

The initiation of the coacervation is easily recognized by a turbidity of the solution, and if desired may be determined beforehand by a blank test without the presence of the liquid to be encapsulated. The coacervation takes place over a range of temperature due to the fact that the particles of the copolymer do not have a uniform molecular weight. Therefore, it is usually desired to raise the temperature of the dispersion 10° to 30° C. above the initial temperature at which the first sign of turbidity occurs. Initial temperatures of about 35° to 100° C. are satisfactory although initial temperatures as low as 10° C. may be used when low boiling liquids are to be encapsulated.

The hardening of the capsule envelopes may be effected with known cross-linking agents such as aldehydes or oxidation agents or mixtures of several hardening agents. Examples of suitable hardening agents are aldehydes such as formaldehyde, or glyoxal, alkali metal hypobromites or hypochlorites, and mixtures of formaldehyde and persulfates or alkali metal hypobromites and formaldehyde. During the hardening, the pH range of the solution will depend upon the particular hardening agent used. For example, best results are obtained with glyoxal at a pH of about 4 and with alkali metal hypobromites at a pH of about 8 to 10.

The capsules can be recovered after hardening by filtration, centrifugation, etc., and the recovered capsules may be dried at elevated temperatures and/or in vacuo or by spray drying to form a dry powder of the capsules. If desired, the dried capsules in powder can be molded or caused to agglomerate into a desired grain size without any appreciable degree of destruction of the capsule.

The stability of the capsule envelope which is determined by the weight ratio of the liquid to be encapsulated and the water-soluble copolymer and upon the degree of hardening which is determined by the type and amount of hardener used, time of hardening treatment and hardening temperature. The capsules are stable even though the amount of encapsulated oil in the finished capsules is more than 50% by weight of the capsules and in some cases may be 90% or higher. In the latter case, the capsules have particularly thin envelopes which readily and relatively completely rupture under application of pressure to them and are therefore especially well suited for several purposes.

By the addition of inorganic salts such as alkali metal sulfates to the aqueous solution before heating, the temperature of coacervation can be reduced. It is also possible to induce coacervation solely by the addition of inorganic salts to the solution. However, it is preferable not to add said salts in either case since the capsules must be washed after their recovery to remove residual salt.

Suitable liquids to be encapsulated are those liquids which are insoluble or only slightly soluble in water. Examples of suitable liquids are water-immiscible hydrocarbons such as nonane and xylene; vegetable oils such as olive oil, coconut oil and castor oil; fish oil such as sperm oil and seal oil; mineral oils such as petroleum lubricating oil and kerosene; and synthetic oils such as chlorinated diphenyl, methyl salicylate, etc. The liquids to be encapsulated may contain dissolved or dispersed materials such as medicines, adhesives, dyestuffs or inks, perfumes, etc.

The capsules are used to protect sensitive materials from external influences such as air and humidity, to prevent reaction or contamination with other materials during storage or use, to facilitate shipping or dosing of the encapsulated liquids and for other known purposes. The encapsulated liquids are easily released by destruction of the capsule envelopes by external or by chemical means.

In the following examples there are described several embodiments to illustrate the invention. However, it should be understood that the invention is not intended to be limited to the specific embodiments.

Example I

*Preparation of copolymer of acrylamide and N-tert-butyl-acrylamide.*—15 gm. of acrylic acid amide were dissolved in 190 cc. of water. The solution was heated to 60° C. and was admixed with a warm solution of 15 gm. of N-tert-butyl-acrylamide in 60 gm. of methanol. Into this clear solution of the monomers at 60° C., 30 cc. of an aqueous solution which contained 0.075 gm. of potassium persulfate were allowed to flow over a period of two hours accompanied by stirring. The polymerization, whose initiation could be recognized by a moderate increase in the temperature, had gone to completion after two hours of stirring at 60° C. The solution thus obtained was subsequently evaporated in vacuo, and the reaction product was precipitated with acetone. The copolymer thus obtained was separated by vacuum filtration and was dried.

PROCESSES OF ENCAPSULATION

Example II 125 cc. of a 10% aqueous solution of the copolymer of acrylamide and N-tert-butylacrylamide prepared in accordance with Example I, whose viscosity was less than 10,000 cp., were diluted with 375 cc. of water. 50 gm. of xylene were dispersed in this solution by vigorous stirring. The dispersion was heated to 80° C. and the dispersion was stirred for thirty minutes at this temperature. Thereafter, the dispersion was adjusted to a pH value of 4.0 by the addition of dilute acetic acid and 20 gm. of glyoxal were added thereto. Subsequently, the mixture was stirred for an additional three hours at 80° C. After cooling, the hardened capsules were isolated by filtration and were dried at 50° C.

Example III 12.5 gm. of the copolymer of acrylamide and N-tert-butyacrylamide prepared according to Example I were dissolved in 500 cc. of water, and 50 gm. of xylene were dispersed in this solution by vigorous stirring. The resulting dispersion was heated to 80° C. and was stirred at this temperature for thirty minutes. Subsequently, 50 cc. of an aqueous solution which contained 12.5 gm. of bromine and 10.1 gm. of potassium hydroxide and had a pH value of 13.3 were added to the dispersion. After stirring the mixture for one hour at 80° C., 10 cc. of a 40% aqueous formaldehyde solution were added and the mixture was stirred for sixty minutes more at 80° C. Thereafter, the capsules formed thereby were filtered off and were dried at 50° C.

Example IV 12.5 gm. of the copolymer of acrylamide and N-tert-butylacrylamide prepared in accordance with Example I were dissolved in 500 cc. of water, and 50 gm. of xylene were dispersed in this solution by vigorous stirring. The resulting dispersion was heated to 80° C. and then 300 cc. of a cold-saturated sodium sulfate solution were added dropwise over a period of thirty minutes. Thereafter, 50 cc. of an aqueous solution which contained 12.5 gm. of bromine and 10.1 gm. of potassium hydroxide were added. After stirring this mixture for sixty minutes at 80° C., 20 cc. of a 40% formaline solution were added and the mixture was stirred for another sixty minutes. In this manner an aqueous suspension of oil-containing capsules having a diameter of 80–100μ was obtained. The capsules were filtered off and were washed on the filter until free from salt. Subsequently, the capsules were suspended in water and were then subjected to spray drying whereby they were obtained in the form of a dry, free-flowing powder.

Example V 2.5 gm. of the copolymer of equal parts of acrylamide and N-tertiary-butyl-acrylamide prepared according to Example I were dissolved in 100 cc. of water. After addition of 0.5 gm. of an emulsifier (ethoxylated fatty alcohol with a chain length $C_{12-18}$), 15 gm. of dibutylphthalate were emulsified in this solution by vigorous stirring. The emulsion was adjusted to a pH value of 6.8 by addition of dilute sodium hydroxide, and the emulsion was heated over a period of thirty minutes to 80° C. Subsequently, 13.5 gm. of a 30% aqueous glyoxal solution which had been adjusted to a pH value of 4 were added to the emulsion. The resulting mixture was stirred for three additional hours at a temperature of 80° C. and was then cooled to room temperature. The hardened capsules which were formed thereby were filtered off and were dried at 50° C.

Example VI 2.5 gm. of the copolymer of equal parts of acrylamide and N-tertiary-butyl-acrylamide prepared according to Example I were dissolved in 100 cc. of water. After adding 0.5 gm. of an emulsifier (ethoxylated fatty alcohol with a chain length of $C_{12}$–$C_{18}$), 20 gm. of toluene were emulsified in this solution by vigorous stirring. Thereafter, the emulsion was adjusted to a pH value of 6.5 by addition of dilute sodium hydroxide, and the emulsion was heated over a period of thirty minutes to 80° C. Subsequently, 13.5 gm. of a 30% aqueous glyoxal solution, which had been adjusted to a pH value of 4, were added to the emulsion. The resulting mixture was stirred for three additional hours at a temperature of 80° C. and was then cooled to room temperature. Thereafter, the hardened capsules which had formed were filtered off and were dried at 50° C.

Example VII

Example VI was repeated, but with the difference that instead of 20 gm. of toluene, 20 gm. of a 50% solution of polyvinyl acetate in toluene was encapsulated. In this case the capsules were also obtained in the form of a dry, free-flowing powder.

Various modifications of the process of the invention

We claim:

1. A process for encapsulating liquids being not more than slightly miscible with water which comprises dispersing the liquid in an aqueous solution having 0.5 to 10% by weight of a water-soluble copolymer of acrylamide and at least one N-substituted acrylamide having the formula

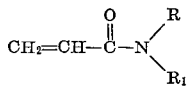

wherein R is an alkyl radical having 1 to 8 carbon atoms and $R_1$ is selected from the group consisting of hydrogen and an alkyl radical having 1 to 7 carbon atoms with the sum of carbon atoms in R and $R_1$ being between 2 and 8, heating the resulting dispersion to effect coacervation, adding a cross-linking agent while maintaining the coacervation temperature to harden the copolymer and form capsules of the copolymer containing the liquid and recovering and drying the said capsules.

2. The process of claim 1 wherein the N-substituted acrylamide is N-tertiary-butylacrylamide.

3. The process of claim 2 wherein the weight ratio of acrylamide to N-tertiary-butylacrylamide in the copolymer is between 35:65 and 65:35.

4. The process of claim 1 wherein the cross-linking agent is glyoxal.

5. The process of claim 1 wherein the cross-linking agent is selected from the group consisting of alkali metal hypobromites and hypochlorites.

6. The process of claim 1 wherein the cross-linking agent is an oxidizing agent and an aldehyde.

7. The process of claim 1 wherein the aqueous solution has 1 to 4% by weight of the copolymer.

8. The product produced by the process of claim 1.

References Cited by the Examiner

UNITED STATES PATENTS

| 2,886,445 | 5/1959 | Rosenthal et al. | 99—135 |
| 3,069,370 | 12/1962 | Jensen et al. | 252—316 XR |

FOREIGN PATENTS

| 1,110,422 | 7/1961 | Germany. |

OTHER REFERENCES

Gregory: "Uses and Applications of Chemicals and Related Materials," volume 1, Reinhold Publishing Corporation, New York, 1939, page 542.

JULIUS GREENWALD, *Primary Examiner.*